(12) United States Patent
Chung

(10) Patent No.: US 8,266,012 B2
(45) Date of Patent: Sep. 11, 2012

(54) SUPPLYING METHOD OF INTERIOR MATERIALS ORDERED

(76) Inventor: Doo Ho Chung, Seoul (KR)

( * ) Notice: Subject to any disclaimer, the term of this patent is extended or adjusted under 35 U.S.C. 154(b) by 198 days.

(21) Appl. No.: 12/525,304

(22) PCT Filed: May 7, 2007

(86) PCT No.: PCT/KR2007/002242
§ 371 (c)(1),
(2), (4) Date: Jul. 30, 2009

(87) PCT Pub. No.: WO2008/117904
PCT Pub. Date: Oct. 2, 2008

(65) Prior Publication Data
US 2010/0114738 A1 May 6, 2010

(30) Foreign Application Priority Data
Mar. 28, 2007 (KR) .................. 10-2007-0030334

(51) Int. Cl.
*G06Q 30/00* (2012.01)
(52) U.S. Cl. ..................... 705/26.5; 705/27.1
(58) Field of Classification Search .............. 705/26, 705/27
See application file for complete search history.

(56) References Cited

U.S. PATENT DOCUMENTS

| | | | |
|---|---|---|---|
| 2002/0032536 A1 | 3/2002 | Hirata | |
| 2002/0069078 A1* | 6/2002 | Goldstein | 705/1 |
| 2002/0116293 A1* | 8/2002 | Lao et al. | 705/27 |
| 2005/0003174 A1* | 1/2005 | Ikeda et al. | 428/219 |
| 2005/0071040 A1* | 3/2005 | Kirila | 700/130 |
| 2005/0081161 A1* | 4/2005 | MacInnes et al. | 715/765 |

FOREIGN PATENT DOCUMENTS

| | | |
|---|---|---|
| KR | 1020010103102 A | 11/2001 |
| KR | 1020010105092 A | 11/2001 |
| KR | 1020060062671 A | 6/2006 |

OTHER PUBLICATIONS

GoodHome.com Site Launches, Redefining the Way Consumers Decorate Their Homes. (Sep. 28). PR Newswire,1. Retrieved Jun. 7, 2012, from Business Dateline. (Document ID: 45189990).*

* cited by examiner

*Primary Examiner* — Jeffrey A Smith
*Assistant Examiner* — Resha Desai
(74) *Attorney, Agent, or Firm* — Robert D. Atkins; Patent Law Group: Atkins & Associates, P.C.

(57) ABSTRACT

The present invention relates to a supplying method for interior material ordered to a user who can connect to a server through a network, wherein the server memorizes a program which enables the user to plan a design of the interior material which is operable on the user's web browser, and the supplying method for interior material ordered comprises the steps of: connecting to the server by the web browser of the user, transferring the program which enables the user to plan a design of the interior material from the server to the web browser of the user, receiving execution results of the program which enables the user to plan a design of the interior material from the web browser by the server, digital printing designs on a printing layer of the interior material, based on the execution results of the program which enables the user to plan a design of the interior materials, manufacturing a finished product of interior material including the printing layer digital printed of the interior material, and delivering the manufactured interior material to the user.

12 Claims, 5 Drawing Sheets

[Fig. 1]
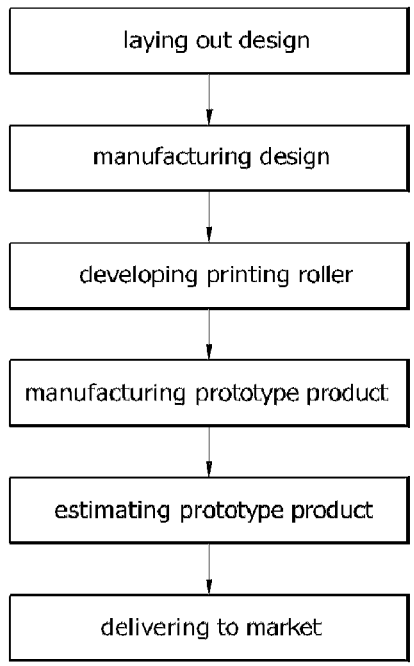
[Fig. 2]
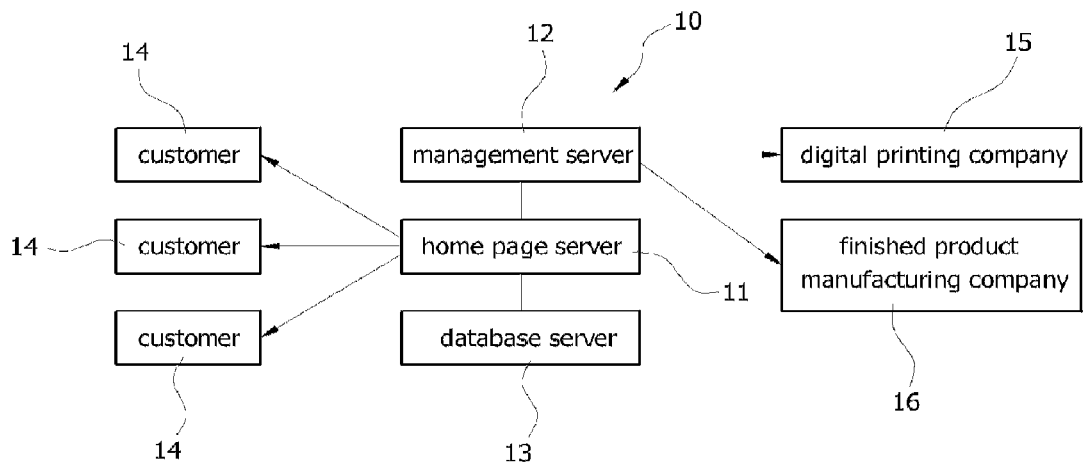

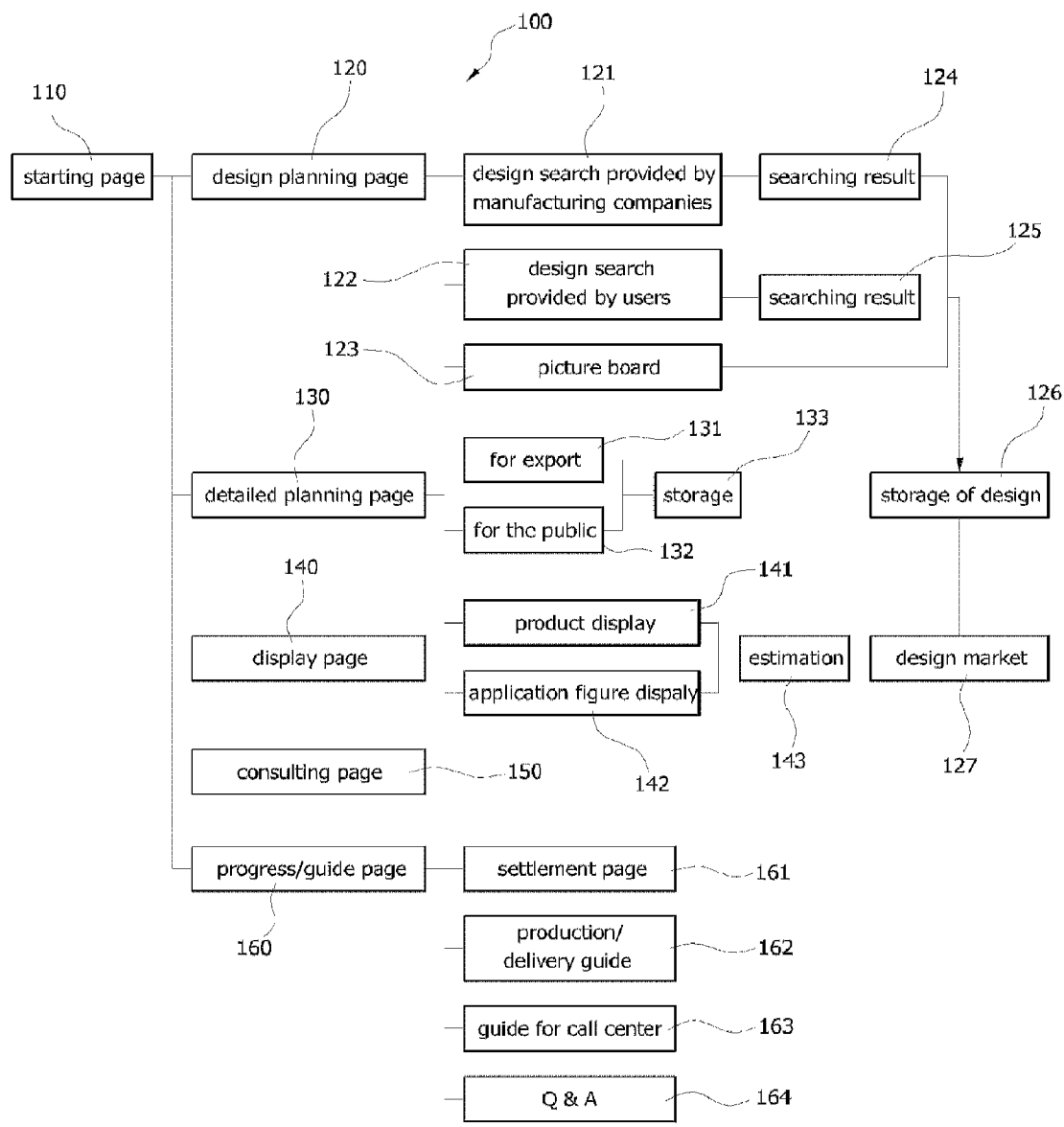
[Fig. 3]

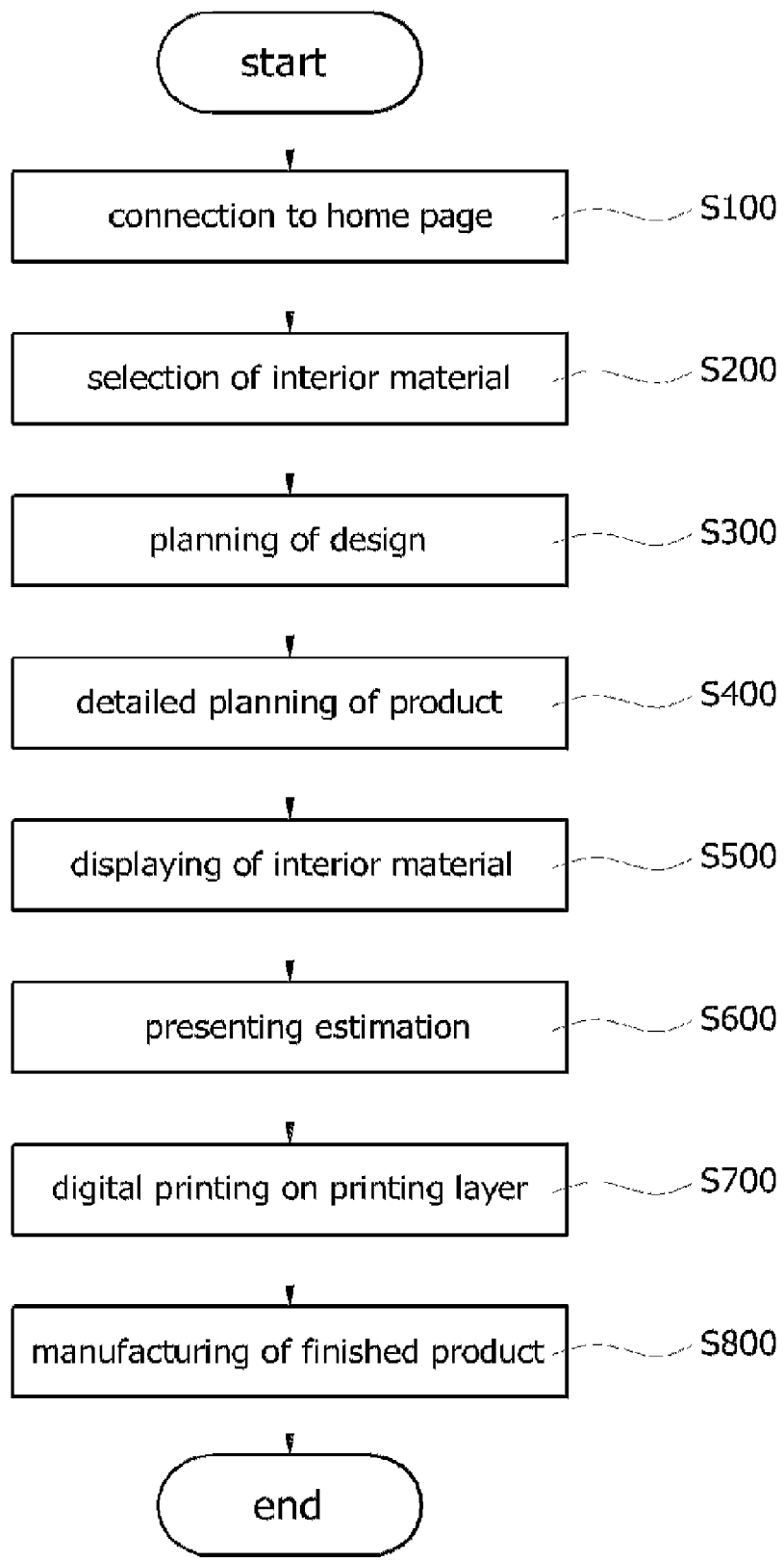

[Fig. 5]
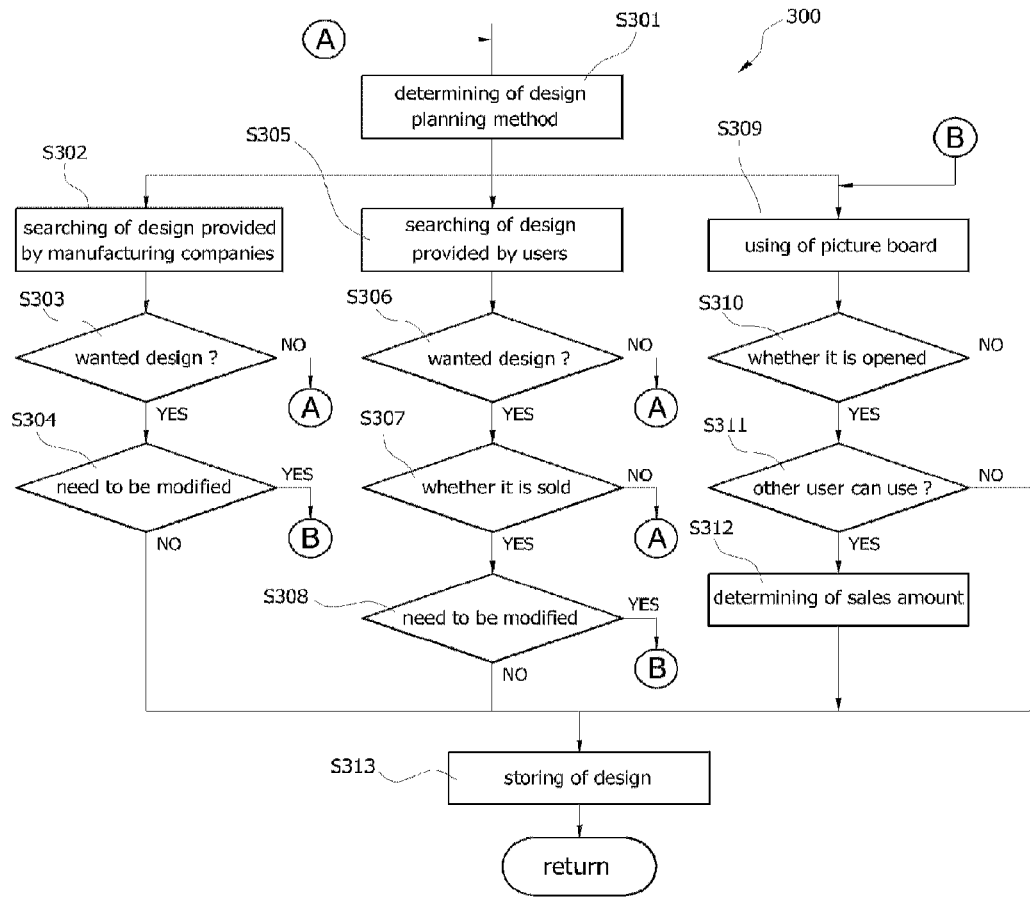
[Fig. 6]
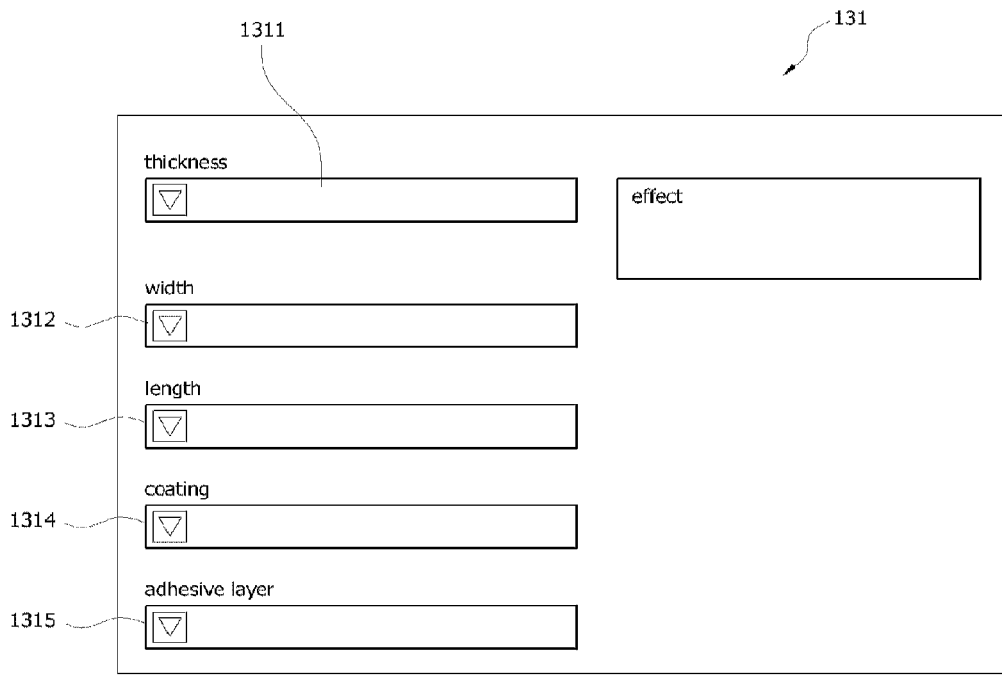

[Fig. 7]
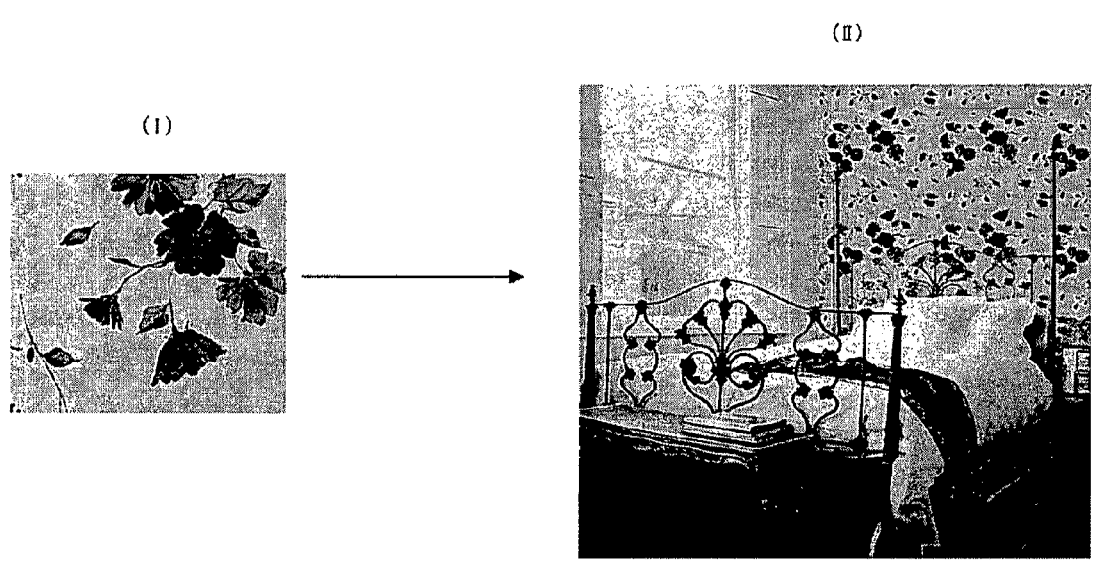

SUPPLYING METHOD OF INTERIOR MATERIALS ORDERED

CLAIM TO DOMESTIC PRIORITY This application is a U.S. National Stage Application filed under 35 U.S.C. 371 claiming priority from International Application No. PCT/KR2007/002242, filed May 7, 2007, which claims the benefit of Korean Application No. 10-2007-0030334, filed Mar. 28, 2007, and which applications are incorporated herein by reference.

TECHNICAL FIELD

The present invention relates to a supplying method of interior materials ordered, and more particularly, relates to a supplying method of interior materials ordered in which a design such as a pattern, a picture, a figure and sketch that is wanted by a user, and a product are laid out in accordance to the user's order, and based on thereof a half-finished product is produced and then a finished product is made to deliver to the user.

BACKGROUND ART

The interior materials such as surface material for furniture, an electronic product, a sash and a gate, etc., a tile, a wall paper, closet material, ceiling material and floor material, etc., are mass produced and then a user has to select some of ready produced materials for interior and thus he/she can not produce interior materials in a small quantity depending on what he/she needs.

FIG. 1 is a flow chart showing a supplying method of wallpaper as one example of interior material according to the prior art. Referring to FIG. 1, the supplying method of wall paper according to the prior art is as follows:

(1) A step of planning a design: A manufacturer of interior material may select a target market and analyze the existing products. According to the result thereof, a produce concept such as an image motive, color and texture, etc. is chosen.

(2) A step of manufacturing a design: A unit pattern and color are designed according to the chosen concept.

(3) A step of developing a design roller: A large roller of a high price for mass production, with produce able width and length, is manufactured based on a unit pattern and a color that is designed. The roller may be a print roller or an embossing roller. The print roller performs a gravure printing by forming a desired design on a cylindrical printing roller and then filling grooves with ink to transfer to wall paper. The embossing roller compresses wallpaper and forms prominence and depression patterns as same as formed on the roller to wall paper.

(4) A step of manufacturing prototype products: The prototype products are manufactured using the developed roller.

(5) A step of evaluating and presenting the prototype products: The produced wall paper is evaluated and among them the wall paper that is expected to sell well on a market is selected. In general, among the prototype product designs that are produced, about 20% thereof is selected for mass production. A sample book of the selected designs is made to distribute to selling agencies. A user can select wall paper from the sample book distributed to agencies and the selected wall paper is delivered to the user from an interior material manufacturer.

DISCLOSURE OF INVENTION

Technical Problem

However, the aforementioned method raises drawbacks as follows.

(1) The needs from users are not reflected positively on manufacturing steps since an interior manufacturer himself/herself estimates a market situation and produces wall paper. In addition, interior material has to be produced and sold using a large roller of a high price. And, products that are patterned on general designs for mass selling are manufactured, and thus the differential needs from interior companies and a few general users can not be satisfied.

(2) A large roller of a high price is manufactured to produce prototype products and thus a small quantity of order cannot be met.

(3) A gravure printing using a large roller has a limitation to a fine printing.

(4) A sample book on which some patterns among the entire patterns are shown is distributed to selling agencies and thus users cannot see the whole figure. In addition, a manufacturer of interior materials opens thorough the sample book, about 20% designs which can be expected to sell well in a market, among all designs developed, and thus the remaining about 80% thereof are not opened regardless of user s needs.

(5) A user has to visit directly to a selling agency to select wall paper and it is not easy for him/her to select wall paper through an internet.

Even though a supplying method for wall paper and drawbacks thereof are described, in case of the most of interior material such as the surface material for furniture, an electronic product, a sash and a gate, etc., and a tile, wall paper, closet material, ceiling material and floor material, etc., they are supplied in a similar way and has the same drawbacks as the wall paper.

Technical Solution

The present invention has been proposed for solving the above problems, one object of which is to provide a supplying method for interior material on which various needs are reflected and a small quantity thereof can be manufactured.

Another object of the present invention is to provide a supplying method for interior material in which various designs developed by a manufacturer of interior material can be provided to users.

Another object of the present invention is to provide a supplying method for interior material in which fine printing surface effects can be produced.

Another object of the present invention is to provide a supplying method for interior material in which a user can select interior material through an internet without visiting agencies.

Another object of the present invention is to provide a supplying method for interior material in which a user can confirm the whole figure of interior material or the interior material applied to interior.

Additionally, another object of the present invention is to provide a supplying method for interior material in which a user can sell design developed by him/her to other users.

To achieve the above objects, the present invention provides a supplying method for interior material ordered to a user who can connect to a server through a network, wherein the server memorizes a program which enables the user to plan a design of the interior material which is operable on the user's web browser, and the supplying method for interior material comprising the steps of: connecting to the server by the web browser of the user; transferring the program which enables the user to plan a design of the interior material from the server to the web browser of the user; receiving execution results of the program which enables the user to plan a design of the interior material from the web browser by the server; digital printing designs on a printing layer of the interior material, based on the execution results of the program which enables the user to plan a design of the interior material; manufacturing a finished product of interior material including the printing layer of the interior material; and delivering the manufactured interior material to the user.

It is possible that server further memorizes a design database provided by manufacturing companies of interior material and a searching program, and the program which enables the user to plan a design of the interior material executes the following steps on the user's web browser: enabling the user to determine the kinds of product of the interior material; transferring the key word inputted by the user to the server; receiving from the server the design searched in the design database provided by manufacturing companies by the searching program, based on the key word; providing the received design for user's selection; providing a picture board on which the user can modify the provided design, when the user want to modify the provided design; and storing and transferring to the server the design selected by the user in the steps of providing the received design and providing a picture board.

Or, it is possible that the server further memorizes a design database provided by other users and a searching program, and the program which enables the user to plan a design of the interior material executes the following steps on the user's web browser: enabling the user to determine the kinds of product of the interior material; transferring the key word inputted by the user to the server; receiving from the server the design searched in the design database provided by other users by the searching program, based on the key word; providing the received design for user's selection; providing a picture board on which the user can modify the provided design, when the user want to modify the provided design; and storing and transferring to the server the design selected by the user in the steps of providing the received design and providing a picture board.

Or, it is possible that the program which enables the user to plan a design of the interior material executes the following steps on the user's web browser: enabling the user to determine the kinds of product of the interior material; providing a picture board on which the user can upload a design invented by the user and the user can modify the uploaded design; and storing and transferring the design selected by the user in the step of providing a picture board.

The step of providing a picture board can comprise a step of uploading the design invented by the user in case where the design is searched from database.

The program which enables the user to plan a design of the interior material can further execute a step of showing whether the received design can be sold on the user's web browser in case where the design is searched from the database provided by other users, and the steps of providing a picture board and transferring the design selected can be executed when the received design can be sold.

The program which enables the user to plan a design of the interior material can further execute the following steps on the user's web browser: enabling the user to determine whether the design selected by the user is to be opened; enabling the user to determine whether other users can use the selected design, when the selected design is determined to be opened; and enabling the user to determine whether the selected design can be sold and sale amount thereof.

The server can further memorize the program which enables the user to plan a detailed contents of the interior material which is operable on the user's web browser, the step of transferring program can further comprises a step of transferring the program which enables the user to plan a detailed contents of the interior material, the step of receiving execution results of the program can further comprises a step of receiving execution results of the program which enables the user to plan a detailed contents of the interior material from the user's web browser by the server, and the printing layer of the interior material and the finished product are selected based on the execution results of the program which enables the user to plan a detailed contents of the interior material. The program which enables the user to plan a detailed contents of the interior material can execute a step on the user's web browser of enabling the user to determine at least one of usage, thickness, width, length, surface material, surface effect and whether adhesive layers are added.

The server can further store a program of producing an image to which the interior material is applied to interior based on the execution results of the program which enables the user to plan a design of the interior material, and the supplying method for interior material ordered can further comprise a step of transferring the resulted image of the execution of the program which produced an image that the interior material is applied to interior from the server to the web browser.

The interior material may include the surface material for furniture, an electronic product, a sash and a gate, etc., a tile, wall paper, closet material, ceiling material and floor material.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings;

FIG. 1 is a flow chart showing a supplying method for interior material according to the prior art;

FIG. 2 is a system block diagram showing a supplying method for interior material according to the present invention;

FIG. 3 is a block diagram showing a homepage configuration according to an embodiment of the present invention;

FIG. 4 is a flow chart showing a supplying method for interior material according to an embodiment of the present invention;

FIG. 5 is a detailed flow chart of the interior planning step in FIG. 4;

FIG. 6 is an exemplary view showing a homepage picture in the step of planning products in FIG. 3; and FIG. 7 is an exemplary view showing a homepage picture in the demonstrating step in FIG. 3.

MODE FOR THE INVENTION

Reference will now be made in detail to the preferred embodiments of the present invention, examples of which are illustrated in the accompanying drawings.

FIG. 2 is a system block diagram showing a supplying method for interior material according to the present invention. Referring to FIG. 2, a system 10 according to the present invention includes a homepage server 11 that is connected to an internet and drives a homepage, a management server 12 that is connected to the homepage server 11 and manages an order of products, a settlement, a production process, a forwarding/delivery and a call center, a database server 13 that stores data of product kinds, design patterns stored by interior material manufacturers and users, etc., and executes a searching engine, customers 14 that is connectable to the homepage server 11 through an internet, digital printing companies 15 and manufacturers of finished products 16 that receives the orders from the homepage server 11 or the management server 12.

A configuration of a homepage 100 that is driven in the homepage server 11 is shown in the block diagram of FIG. 3. Referring to FIG. 3, the homepage 100 includes a starting page 110, a design planning page 120, a detailed planning page 130, a display page 140, a consulting page 150 and progress/guide page 160.

The starting page 110 as an initial picture of the homepage 100 is connected to other pages 120 to 160. In addition, a user may login to the starting page 110.

The design planning page 120 may select kinds of products (the surface material for furniture, an electronic product, a sash and a gate, etc., a tile, wall paper, wall closet, ceiling material and floor material, etc.), and is connected to a design searching page provided by manufacturers of interior materials 121, a design searching page 122 provided by users, and a picture board 123. The design searching page provided by manufacturers of interior materials 121 and the design searching page provided by users 122 are connected to the searching result pages 124, 125 and thus the searching results from the searching pages 121, 122 are shown on the searching result pages 124, 125. The searching result pages 124, 125 may be connected to the picture board page 123. A user may upload the designs developed by himself/herself on the picture board page 123 or modify the designs developed or searched. The searching result pages 124, 125, and the picture board page 123 are connected to a design planning storage page 126. In addition, the design planning storage page 126 is connected to the starting page 110, the detailed planning page 130, etc. Meanwhile, the design planning storage page 126 can be connected to a design market page 127.

The detailed planning page 130 is connected to a decision page of detailed contents for the expert 131 and a decision page of detailed contents for the public 132. The decision pages of the detailed contents 131, 132 are connected to the detailed planning storage page 133, respectively, and the detailed contents decided in the decision page of detailed contents 131, 132 are stored thereto. The product planning storage page 133 is connected to the starting page 110 and the display page 140, etc.

The display page 140 is connected to a product display page 141 and an application figure display page 142. The product display page 141 may display the design planned and the product figure applied to the detailed contents of the product, and the application figure display page 142 may display figures of the products embodied practically to interior. The product display page 141 and the application figure display page 142 may be connected to an estimation page 143, or the design planning page 120 and the product planning page 130. The estimation page 143 may estimate the products and show thereof based on the design planned and the detailed contents of the products. The estimation page 143 may be connected to the starting page 110 and the progress/guide page 160.

Through the consulting page 150 as a bulletin board, a user may consult the design planned by himself/herself and the detailed contents of the products to the experts.

The progress/guide page 160 may be connected to a settlement page 161 through which a user can settle based on the estimation page 143, a production/delivery guide page 162 through which a user may confirm progress of products ordered by a user, a call center guide page 163 and Q&A page 164, etc.

The configuration of the home page 100, as described aforementioned, will be described in detail in relation to a supplying method of interior material according to an embodiment of the present invention.

The management server 12 may perform a settlement based on a direction from the home page server 11 and command an order of manufacturing products to a digital printing company 15 and a manufacturer of finished products 16. The management server 12 may manage the progress of production that is performs in a digital printing company 15 and a manufacturer of finished products 16, and a supply and a delivery of the finished products manufactured to a market, and transfer the information of current production/delivery steps to the home page server 11. In addition, the management server 12 may manage an expert consulting and call center, etc.

The database server 13 may store data of product kinds, the designs provided by manufacturers of interior and users and the detailed contents of the products, etc. Additionally, the database server 13 may execute a searching engine that may search these data.

The customers 14 may be various kinds of users such as interior planning/designing companies that plan/design the interior of commercial buildings, houses, and apartments, the whole salers and retail traders of interior material such as special expert whole salers and retail traders or common whole salers and retail traders, and common users. The customers 14 may connect to the home page server 11 through an internet, and plan and settle the wanted design and products having the detailed contents and then command an order. In addition, the customers 14 may connect to the home page server 11 to consult to the expert and confirm the states of production/delivery of the products ordered by himself/herself.

The digital printing companies 15 may produce half-finished products by digital-printing the design planned by a user to a printing layer of interior material according to a direction from the management server 12. Here, an ink jet printing, a water printing, and an UV printing, etc. may be used for the digital printing. In the prior art, a roller for mass production has to be manufactured; however, according to the present invention, a small quantity of printing is possible using a digital printing, based on the designs desired by users. In addition, the digital printing can express fine figure of the detailed part and thus has good expression ability, compared with a gravure printing by a roller in the prior art.

The manufacturing companies of the finished-products 16 may receive the half finished-products from the digital printing companies 15, and then manufacture finished-products. Here, in case where the interior material ordered by a user is a structure of stacked-layers of a plurality of layers, the manufacturing companies of finished-products 16 may receive a printing layer to which design is printed from the digital printing companies 15 and stack other layers to manufacture the finished-products. Additionally, in case where the interior materials ordered by a user needs to be coated with glossy layers and adhesive layers, etc., the manufacturing companies of the finished-products 16 may perform coatings and thus makes the finished-products enough to deliver to the customers 14.

The supplying method for interior materials that is embodied in the aforementioned system 10 will be described in detail referring to the flow chart of FIG. 4.

The customer (or user) 14 may connect to the home page server 11 through an internet (S100 step). At this time, if necessary, the user may enroll a membership or login.

The user may select the desired kinds of the interior materials such as surface material for furniture, an electronic product, a sash and a gate, etc., a tile, wall paper, wall closet, ceiling material and floor material, etc. on the starting page 110, and the selected kinds are stored in a server (S200 step). In subsequent, the user may plan desired designs of interior materials (S300 step).

FIG. 5 is a detailed flow chart of the interior planning step in FIG. 4.

Referring to FIG. 5, a user first may determine planning methods of desired designs whether he/she may search from the database provided by the manufacturing companies of interior materials including a digital printing companies and the manufacturing companies of finished-products, or a design company, or from the design database (design market) opened by other users, or may use the designs that is invented by himself/herself (S301 step).

Here, in case where the user determines that he/she searches the desired designs from the database provided by the manufacturing companies of interior materials or a design companies, he/she may proceed to the searching page of designs 121 provided by the manufacturing companies of interior materials. At this time, the user may input a key word and then it is transferred to the home page server 11 and the database server 13. Here, the searching results from the database of the database server 13, provided by the manufacturing companies of interior materials, are transferred to user's computer and then expressed on the searching result page 124 (S302 step). The database may include natural patterns, sketches, pictures and logos, etc.

The user may determine whether the searching results meet the desired designs (S303 step). Here, in case where there are no desired designs (NO in step of S303), the flow may proceed to a step (S301) of selecting design planning method.

In case where there are desired designs (YES in step of S303), the user may determine whether the selected designs need to be modified (S304 step). In case where a modification thereof is not necessary (NO in step of S304), it may proceed to the step of S313. Meanwhile, in case where a modification thereof is necessary (YES in step of S304), it may proceed to the step of using the picture board (S309).

In addition, in case where the user determines that he/she searches the desired designs from the design database (design market) provided by other users, it might proceed to the design searching page 122 provided by users. The user may input a key word and then it is transferred to the home page server 11 and the database server 13. Here, the searching results from the database of the database server 13, provided by the user, is transferred to user s computer and then expressed on the searching result page 125 (S305 step). The database may include natural patterns, sketches, pictures and logos, etc.

The user may determine whether there are desired designs from the searching results (S306 step). Here, in case where there are no desired designs (NO in step of S306), it may proceed to the step (S301) of selecting design planning method.

In case where there are desired designs (YES in step of S306), the user may determine whether the selected designs correspond to the available designs sold by other users (S307 step). Here, in case where the selected designs may be unavailable designs in a market (NO in step of S307), it may proceed to the step of S301.

Meanwhile, in case where the selected designs are available in a market (YES in step of S307), the user may determine whether the selected designs need to be modified (S308 step). In case where a modification thereof is not necessary (NO in step of S308), it may proceed to the step of S313. Meanwhile, in case where a modification thereof is necessary (YES in step of S308), it may proceed to the step of using the picture board (S309).

In case where the user determines that the selected designs from the database provided by a manufacturing company of interior materials need to be modified (YES in step of S304), the selected designs from the database provided by user need to be modified (YES in step of S308), or determines to use the designs invented by himself/herself in step of S301, the user may use pictures on the picture board 123 (S309 step).

The user may upload the designs invented by himself/herself or the designs selected from the database to the picture board and then change size, shape, pattern and color, etc. of the uploaded designs. In addition, the user may invent designs using the picture board.

When the picture board is finished to use, the user may store the designs invented or modified by himself/herself to the design database (design market) provided by user and then determine to open to other user or not (S310 step). Here, in case where the user determines not to open the designs invented or modified by himself/herself (NO in step of S310), it may proceed to the step of S313. Meanwhile, in case where the user determines to open the designs invented or modified by himself/herself (YES in step of S310), the user determines whether other user may use the opened designs (S311 step). In case where the user determines for other user not to use the opened designs (NO in step of S311), it may proceed to the step of S313. In case where other user may use the opened designs (YES in step of S311), the sales amount of the opened designs is determined (S312 step). As a result, in case where other user may use later the designs invented or modified by user, the user may gain a predetermined profit.

Additionally, in case where user may select designs from the design databases provided by a manufacturing companies of interior materials or by users, or the user may invent a design and finish planning of the design, the planned design may be transferred to the home page server 11 and the management server 12 to be stored thereto (S313 step). The stored design may be used later to manufacture products. Here, in case where the user determine that he/she invents designs or selects designs from database, modifies the design and then opens the design, the design may be stored to the design database (design market) provided by user of the design database server 13. Here, the information of the design that is determined to open by user and the user who invented or modified this design, the information of original design when the modified design is stored, and the information of whether other user may use and the sales amount when other user may use, etc. may be stored on the design database provided by user.

When storage of planned design is finished (S313 step), the design planning step of interior material (S300 step) is finished and it may proceed to the detailed planning step of interior material (S400 step in FIG. 3).

When the kinds of interior materials and the design planning that are wanted by user are determined (S200 and S300 steps), the user may determine a thickness, a width, a length, and surface material of the interior material, and further may determine a adhesive layer to detailed-plan the product of interior material (S400 step).

FIG. 6 is an exemplary view showing a homepage picture (decision pages of detailed contents; 131, 131 in FIG. 3) on which user may plan interior material in the step of detailed-planning interior material (S400 step). FIG. 6 shows a picture of a decision page of detailed contents for the expert 131 as an example case of planning wallpaper.

Referring to FIG. 6, the picture of a decision page of detailed contents for the expert 131 includes a thick decision window 1311, a width decision window 1312, a length decision window 1313, a coating window 1314 and a adhesive layer window 1315, etc.

A plurality of layers of wallpaper are stacked, and a user may select kinds of layers to be stacked and the order of stacking on the thickness decision window 1311. Generally, wallpapers are stacked in order of a vellum paper, PVC layer and printing layer; however, user may change or designate these kinds and order in detail. For example, when a user wants wallpaper for an office, he/she selects a surface layer of material, which is thick, not to be scratched easily, and has a strong durability. When a user wants wallpaper for a bathroom, he/she may select material of a waterproof layer. The user may select a width and a length of wallpaper on the width decision window 1312 and the length decision window 1313 or input directly thereto. Also, the user may determine whether a surface of wallpaper is to be coated, and select the kinds of coatings, if he/she determines to do. For example, the user may select a coating for protecting wallpaper or a silver nano coating. Additionally, the user may determine on the adhesive layer window 1315 whether an adhesive layer is added to wallpaper.

A user may input the kinds of layers of wallpaper to be stacked, order and kinds of coatings, etc. on the decision page of detailed contents for the expert 131. Meanwhile, a general user, who has no much knowledge of detailed configuration of wallpaper, may use a decision page of detailed contents for the public 132. The decision page of detailed contents for the public 132 includes, instead of the thickness decision window 1311 and the coating window 1314, etc., for example, a usage (office, bedroom, living room, etc.) decision window, an effect (silk effect, leather effect, fiber effect, glazing, half-glazing, non-glazing, existing or non-existing of embossing, etc.) decision window, and a special function (loose preventing, dust proof, water proof, proof germ, proof frozen, proof moth, proof electronic wave, antibiosis, deodorization, absorption sound, aroma, etc.) selection window. Based on the contents selected by a user, the kinds of layers of wallpaper to be stacked, order and kinds of coatings are selected automatically.

Even though wallpaper is described referring to FIG. 6 in this embodiment, with respect to interior materials such as furniture, an electronic product, a sash and a gate, etc., a tile, wall paper, wall closet, ceiling material and floor material, etc., product planning is performed in a similar way.

When a user determines the detailed contents of interior products, they are transferred to the home page server 11 and the management server 12 and stored therein to complete the step of detailed planning interior material (S400 step).

Meanwhile, even though it is described in this embodiment that after the planning step of interior material design (S300 step) is finished, the detailed planning step of interior material (S400 step) is to be performed, it is possible that after the detailed planning step of interior material (S400 step) is finished, the planning step of interior material design (S300 step) may be performed.

When the detailed planning step of interior material (S400 step) is finished, a user may display figures applied to the interior material on his/her computer (S500 step), based on the results of the planning step of interior material (S300) and the detailed planning step of interior material (S400).

The design of interior material such as the surface material for furniture, an electronic product, a sash and a gate, etc., and a tile, wall paper, wall closet, ceiling material and floor material, etc., is planned as a unit pattern, and actual interior material is fabricated by repeating the planned unit design. Accordingly, when the design that is planned by a user in the planning step of interior material (S300) is applied to an actual product, it can be deviated from the user's expect. In addition, when the effect that is planned by a user in the detailed planning step of interior material (S400) is applied to an actual product, it can be deviated from the user's expect. For compensating these drawbacks, the home page server 11 may produce an actual image of interior material or an image thereof applied to interior, and transfer them to a user computer, based on the results planned in the planning step of interior material (S300) and the detailed planning step of interior material (S400).

As to the figures of designs applied to interior material, the product as a whole interior material to which unit design patterns are applied may be displayed (on the product display page 141 in FIG. 3), or the figure of interior material used practically may displayed (on the application figure display page 142). In case of displaying the figure used practically, a user may select a situation similar to the situation to which interior material is applied and configure the figure to which interior material is used. FIG. 7 is a view showing an example of a picture displaying the figure to which interior material is applied practically (142 in FIG. 3). Referring to FIG. 7, in case where a user plans a unit design pattern (I) with respect to wallpaper for a bedroom is designed, one of examples (II) in which the wallpaper configured by repeating this unit pattern (I) is applied to a bedroom, is shown.

When a product planning is finished in the design planning step (S300) of interior material and the detailed planning step of interior material (S400), or the interior material displayed in the step of displaying interior material meets a user's need, an estimation of the product planned by the user is presented to him/her (S600 step). Here, this estimation is produced automatically based on the design selected in the design planning step of interior material (S300) and the detailed conditions of the interior material planned in the detailed planning step of interior material (S400).

When a user may pay on an account with respect to the estimation, the management server 11 may request a digital printing company 15 for a digital printing (S700). That is, the management server 11 may provide the digital printing company 15 with information of material, width, and a length of printing layer, among the design selected in the design planning step of interior material (S300) and the detailed contents of the interior material planned in the detailed planning step of interior material (S400), and request for ink jet printing, a water printing or UV printing in accordance with the design and the detailed contents provided. A digital printing may be used in various field based on a original paper for a printing, and can express a fine figure, compared with a gravure printing by a roller according to the prior art. In addition, the digital printing company 15 may report a finish of a digital printing to the management server 11. When a finish of a digital printing is not reported, a message of "printing" with respect to the interior material requested by a user is shown on the production/delivery guide page (162 in FIG. 3) of homepage.

When a digital printing is finished in a digital printing company 15, the finished product manufacturing company 16 may manufacture a finished product of interior material including the printing layer of interior material (half finished product) having been digital-printed in the digital printing company 15 (S800). That is, the finished product manufacturing company 16 receives a printing layer having been digital printed from the digital printing company 15 and then stacks thereon other layer of which material, width and length are determined in the detailed planning step of interior material (S400), and may add a coating layer and/or adhesive layer thereto. In addition, in case where a production of finished precut is complete, the finished product manufacturing company 16 may it to the management server 11. In case where there is no report of it, a message of "manufacturing" with respect to the interior material requested by a user is shown on the production/delivery page (162 in FIG. 3) of the home page (100 in FIG. 3).

When a finished product is completed in the finished product manufacturing company 16, a final confirmation thereof is made and then it may be delivered to a user. At this time, a message of "delivering" with respect to the interior material requested by a user is shown on the production/delivery page (162 in FIG. 3) of the home page (100 in FIG. 3). In case where interior material is arrived to a user, a message of "completing" is shown on production/delivery page 162.

Industrial Applicability

According to a supplying method of interior material ordered according to the present invention, a user may plan an interior material having a desired design and a detailed contents using an internet, and may obtain interior material even in a small quantity, to which his/her request is applied through a digital printing. In addition, a user may obtain interior material on which a fine figure can be printed through a digital printing, compared with the prior gravure printing.

Meanwhile, a manufacturing company of interior material needs not to prepare manufacturing equipment at high price such as a printing roller, thereby providing a user with various designs developed by itself.

Additionally, a user using a sullying method for interior material ordered according to the present invention can sell the design developed by him/her to other user, thereby obtaining profit.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

The invention claimed is:

1. A supplying method for interior material ordered by a user who can connect to a server through a network, wherein the server memorizes a program that enables the user to plan a design of the interior material and that is operable on the user's web browser, the supplying method comprising the steps of:
   connecting to the server by the web browser of the user;
   transferring the program from the server to the web browser of the user, wherein the interior material includes a printing layer and at least one other layer, wherein the program executes a step on the user's web browser of enabling the user to determine a type for each layer of the interior material and an order in which the layers are stacked to form the interior material;
   receiving execution results of the program from the web browser by the server, the execution results including the design of the interior material;
   digitally printing the design on the printing;
   manufacturing the interior material by stacking the printing layer and the at least one other layer in the order determined by the user;
   delivering the interior material to the user;
   wherein enabling the user to determine the type for each layer of the interior material and the order in which the layers are stacked to form the interior material comprises:
      enabling the user to specify a location for the interior material,
      enabling the user to specify a surface effect for the interior material,
      enabling the user to specify a special function for the interior material, and
      automatically selecting the type for each layer, the order in which the layers are stacked, and a coating or absence of a coating for each layer based upon the selected location, surface effect, and special function;
   wherein enabling the user to specify the special function for the interior comprises enabling the user to specify at least one selected from the group consisting of dust proofing, waterproofing, germ proofing, moth proofing, freeze proofing, electronic wave proofing, deodorizing, sound absorption, aroma, and antibiosis; and
   wherein the interior material includes a surface material for furniture, an electronic product, a sash and a gate, a tile, a closet material, a ceiling material, and a flooring material.

2. A supplying method for interior material ordered according to claim 1,
   wherein the server further memorizes a design database provided by manufacturing companies of interior material and a searching program, and
   wherein the program executes the following steps on the user's web browser:
      enabling the user to determine the kinds of product of the interior material;
      transferring a key word inputted by the user to the server;
      receiving from the server the design searched in the design database provided by the manufacturing companies of interior materials by the searching program, based on the key word;
      providing the received design for user's selection;
      providing a picture board on which the user can modify the provided design, when the user wants to modify the provided design; and
      storing and transferring to the server the design selected by the user in the steps of providing the received design and providing a picture board.

3. A supplying method for interior material ordered according to claim 2, wherein the step of providing a picture board comprises a step of uploading a design invented by the user.

4. A supplying method for interior material ordered according to claim 2,
   wherein the program further executes the following steps on the user's web browser:
      enabling the user to determine whether the design selected by the user is to be opened;
      enabling the user to determine whether other users can use the selected design, when the selected design is determined to be opened; and enabling the user to determine whether the selected design can be sold to other users and a sale amount thereof.

5. A supplying method for interior material ordered according to claim 1,
wherein the server further memorizes a design database provided by other users and a searching program, and
wherein the program executes the following steps on the user's web browser:
enabling the user to determine the kinds of product of the interior material;
transferring a key word inputted by the user to the server;
receiving from the server the design searched in the design database provided by other users by the searching program, based on the key word;
providing the received design for user's selection;
providing a picture board on which the user can modify the provided design, when the user wants to modify the provided design; and
storing and transferring to the server the design selected by the user in the steps of providing the received design and providing a picture board.

6. A supplying method for interior material ordered according to claim 5, wherein the step of providing a picture board comprises a step of uploading a design invented by the user.

7. A supplying method for interior material ordered according to claim 5,
wherein the program further executes a step of showing on the user's web browser whether the received design can be sold, and
wherein the steps of providing a picture board and transferring the design selected are executed when the received design is sold.

8. A supplying method for interior material ordered according to claim 5,
wherein the program further executes the following steps on the user's web browser:
enabling the user to determine whether the design selected by the user is to be opened;
enabling the user to determine whether other users can use the selected design, when the selected design is determined to be opened; and
enabling the user to determine whether the selected design can be sold to other users and a sale amount thereof.

9. A supplying method for interior material ordered according to claim 1,
wherein the program executes the following steps on the user's web browser:
enabling the user to determine the kinds of product of the interior material;
providing a picture board on which the user can upload a design invented by the user and the user can modify the uploaded design; and
storing and transferring the design selected by the user in the step of providing a picture board.

10. A supplying method for interior material ordered according to claim 9,
wherein the program further executes the following steps on the user's web browser:
enabling the user to determine whether the design selected by the user is to be opened;
enabling the user to determine whether other users can use the selected design, when the selected design is determined to be opened; and
enabling the user to determine whether the selected design can be sold to other users and a sale amount thereof.

11. A supplying method for interior material ordered according to claim 1, wherein the program executes a step on the user's web browser of enabling the user to determine at least one of a usage for the interior material, a thickness for each layer of the interior material, a surface material for the interior material, a surface effect for the interior material, and whether adhesive layers are added to the interior material.

12. A supplying method for interior material ordered according to claim 1,
wherein the server further stores another program that produces an image illustrating the interior material applied to an interior, based on the execution results of the program, and
wherein the supplying method for interior material ordered further comprises a step of transferring the image from the server to the web browser.

* * * * *